Patented July 3, 1945

2,379,656

UNITED STATES PATENT OFFICE 2,379,656

CATALYTIC POLYMERIZATION OF UN-
SATURATED ORGANIC COMPOUNDS

Robert F. Ruthruff, Chicago, Ill.

No Drawing. Application August 23, 1940,
Serial No. 353,985

10 Claims. (Cl. 260—93)

This invention relates to an improved process for the catalytic polymerization of unsaturated organic compounds. More particularly, this invention relates to an improved process for the catalytic polymerization of unsaturated hydrocarbons. In a more specific sense, this invention relates to an improved process for the catalytic polymerization of isobutene.

The catalytic polymerization of unsaturated organic compounds, for example, unsaturated hydrocarbons and particularly isobutene, in the presence of a boron halide, particularly boron fluoride, is well known in the art. In the presence of boron fluoride, isobutene is rapidly and practically quantitatively polymerized to higher boiling products. The nature of the polymer produced is to a great extent dependent upon the exact reaction conditions employed, the molecular weight of the polymer increasing as the polymerization temperature decreases. When polymerized at its boiling point isobutene gives a rather thick but nevertheless quite mobile oil. An extremely viscous resin is obtained at moderately low temperatures, for example, −40° C. to −60° C., while at still lower temperatures a solid, rubber like polymer results. For obvious reasons, polymers of the nature of extremely viscous resins and of rubber like solids are of the greatest commercial interest and accordingly the low temperature polymerization is isobutene with boron fluoride is widely practiced. As is well known, polymerization reactions are highly exothermic. Because of this heat evolution during reaction it has been impossible hitherto to achieve isobutene polymerization at constant low temperature. For example, if isobutene (which because of the nature of the polymer produced should be diluted with butanes, higher or lower boiling petroleum hydrocarbons or similar materials) is cooled to say −80° C. and then treated with boron fluoride a short induction period usually ensues followed by an extremely violent reaction accompanied by a sharp temperature increase that may reach the boiling point of isobutene or even higher. As a result, the average molecular weight of the resulting polymer is much lower than desired, and furthermore, the polymer is not homogeneous, being a mixture of high molecular weight polymers formed during the low temperature period and of lower molecular weight polymers formed at higher temperature.

Many means have been suggested and used in an attempt to dissipate the exothermic heat of polymerization and thus overcome the disadvantages described. For example, on the large scale, the reaction is conducted in very complicated and expensive reactors similar to heat exchangers. The reactant is in indirect heat exchange relationship with cold fluid and the reactor is so constructed that the distance of any portion of the isobutene to a cold surface is extremely small. Also it is common practice to dilute the isobutene with low boiling solvents, for example, hydrocarbons, particularly paraffin hydrocarbons, containing two or three carbon atoms to the molecule so that part of the heat of polymerization is absorbed in supplying the heat of vaporization of these diluents. Also, frequently solid carbon dioxide is added to the reaction mixture in an attempt to keep temperatures within bounds during reaction. Many other procedures, too numerous to mention, have been suggested and used. As far as I am aware, no means suggested or used to date has completely solved the difficulties arising as a result of the exothermic nature of the polymerization reaction. Additionally, when such means are employed, other difficulties usually arise which must be solved in their turn.

It is obvious that it is impossible to change the exothermic nature of the reaction itself. The procedures of the prior art have sought to obviate the effects of the heat evolved during polymerization by removing this heat as rapidly as it is produced. However, due to the extreme speed of the polymerization reaction, none of these means has been entirely successful. I have found that by repressing the speed of the polymerization reaction to a considerable degree the heat evolved may be removed cheaply, easily and completely by means well known to those skilled in the art. The repression of the speed of the polymerization reaction is accomplished by the use of certain unstable boron fluoride complexes as catalysts.

One object of this invention is to provide an improved process for the catalytic polymerization of unsaturated organic compounds. A further object of this invention is to provide an improved process for the polymerization of organic unsaturated compounds wherein certain boron fluoride complexes are employed as catalysts. An additional object of this invention is to provide an improved process for the catalytic polymerization of unsaturated organic compounds wherein certain boron fluoride complexes are employed as catalysts whereby said polymerization occurs at reasonable velocity. Other objects of this invention will become apparent as the description thereof proceeds.

I am aware that boron fluoride complexes have been suggested in the prior art as catalysts for various reactions. The boron fluoride complexes of the prior art may be divided into two distinct types, neither of which is similar to the boron fluoride complexes of the instant invention. The boron halide complexes of the prior art consist either of boron fluoride united with compounds materially enhancing the activity of the halide or of boron fluoride united with compounds which materially decrease the activity of boron fluoride. The boron fluoride complexes of the instant invention consist of boron fluoride united with compounds which materially reduce the concentration of the halide but neither increase nor reduce its inherent catalytic properties.

As is well known to those skilled in the art, when certain catalytically active halides, for example, halides of boron, aluminum, tin, antimony and the like, are united with acids, or substances capable of giving ionizable hydrogen, such as water, alcohols, phenols and the like, the acidity of the resulting complex is much higher than normal and the catalytic activity of the complex is usually much enhanced over that exhibited by the pure halide. (Annalen der Chemie, volume 453, page 16, 1927; volume 455, page 227, 1927.) Boron fluoride complexes of this type have been proposed as olefine polymerization catalysts. For example, French Patent 793,226, issued January 20, 1936, suggests the use of boron fluoride complexes with water, alcohols (methyl, ethyl, chloroethyl, propyl, butyl, glycol) or acids (formic, acetic, monochloroacetic, propionic, oxalic, succinic, malic, crotonic, benzoic, phenyl acetic) as catalysts for the polymerization of olefines. I have found that such complexes, formed by the union of boron fluoride with an acid or a compound capable of yielding ionizable hydrogen, exhibit more or less enhanced activity in olefine polymerization over that exhibited by the straight halide and accordingly are even less suitable than boron fluoride itself for use as catalysts in the low temperature polymerization of isobutene.

Also, as is well known to those skilled in the art, boron halides, for example, boron fluoride, unite with ethers to form extremely stable addition compounds. In such compounds the catalytic activity of the halide is much reduced and I have found that they are quite unsuitable for catalyzing the low temperature polymerization of isobutene although at 100° C. the ethyl ether-boron fluoride complex is quite effective in polymerizing isobutene to give low boiling liquid polymers. French Patent 801,883, issued August 20, 1936, describes the use of boron fluoride-ether (diethyl, dipropyl, dibutyl, diamyl, ethyl propyl, propyl butyl, diethyl ether of glycol) complexes for the high temperature polymerization of olefines and diolefines and for the alkylation of aromatics with olefines.

In contrast to the two types of boron fluoride complexes of the prior art described immediately above, the boron halide complexes of the instant invention comprise compounds in which the normal catalytic activity of the halide is neither enhanced nor reduced because of said complex formation but rather the boron fluoride complexes of the instant invention comprise compounds in which the effective concentration of boron halide is materially reduced because of said complex formation. As is well known to those skilled in the art, the catalytic behavior of halides of the lighter elements of the right hand subgroup of group III of the periodic table is oftentimes not normal. For example, in many reactions catalyzed by aluminum chloride, for maximum yield of the desired product, the catalyst must be used mole for mole with one of the reacting substances. Obviously, this does not represent orthodox catalytic behavior as generally understood. Usually in catalytic reactions a minimum amount of contact agent serves, theoretically at least, to convert an infinite amount of reactant or reactants to the desired final compound. Because of the unusual behavior of the class of catalysts mentioned it is often possible to vary the speed of the desired catalytic reaction by varying the concentration of the catalyst employed or by adding the total amount of the catalyst portion-wise during the course of the reaction. This is believed to be the case when the boron halide complexes of the instant invention are employed in the low temperature polymerization of isobutene. By the use of such complexes an amount of potential catalyst that can be conveniently measured is added to the medium containing the isobutene and is uniformly dispersed therein but because of the nature of the complexes the concentration of the actual catalyst is extremely low and can be accurately controlled by varying the amount of complex added or the temperature of the reaction medium. For example, by the use of the complexes of the instant invention, of the potential catalyst added to the reaction medium as the complex, only 1% or even less may be in the active form if desired. Because of the low concentration of active catalyst the rate of isobutene polymerization is much reduced and accordingly the heat evolved may be easily, conveniently and cheaply removed by orthodox methods. It might be thought that adding boron fluoride itself to the reaction medium in an amount equal to the concentration of active catalyst furnished by the complexes of the instant invention should give similar results. Experiments have demonstrated that this is not the case for reasons that are as yet not entirely understood. It is believed however that the complexes of the instant invention act not only by reducing the active catalyst concentration in the reaction medium but also by reducing the concentration of active isobutene molecules in the reaction medium. There are indications that the complexes of the instant invention either actually remove activated isobutene molecules from the reaction medium or catalyze the reversion of these to the inactive form. Accordingly, the concentration of boron fluoride and of active isobutene molecules in the reaction medium are, it is believed, both reduced in the presence of the complexes of the instant invention and accordingly the rate of isobutene polymerization is much reduced. Obviously, this explanation, while believed to be correct, is theory only and is in no way to be considered as limiting the instant invention.

Many complexes are suitable for the purposes of this invention. Among these may be mentioned complexes of boron fluoride with acetyl chloride, with chloral and with succinic anhydride. However, other complexes of a purely inorganic nature are suitable, for example, the complex of boron fluoride with phosphine. These complexes may be prepared in any suitable manner, for example, by uniting boron fluoride with the other component in the vapor phase or the liquid phase at low temperatures. Examples of suitable methods for the preparation of representative complexes and the uses thereof will now be given.

Example 1

A flask is filled with the vapors of acetyl chloride. The flask and contents are then cooled to −80° to −100° C. more or less to form a film of condensed acetyl chloride on the walls of the flask following which an excess of boron fluoride is admitted. Reaction occurs rapidly after which excess boron fluoride is pumped off. The flask is rinsed out with liquid butanes which have been cooled to a temperature of −90° C. and the resulting product is added to a solution of one volume isobutene, one volume of butanes and one volume of ethane, the temperature being −90° C. Polymerization proceeds rapidly, but not violently, to form a solid colorless resin which is obtained by evaporation of the diluents. The weight of acetyl chloride used in this example was about 1% of that of the isobutene being polymerized.

Example 2

A flask is filled with the vapors of chloral following which the flask and contents are cooled to −50° C. and an excess of boron fluoride added. Reaction occurs rapidly following which excess boron fluoride is pumped off. The flask and contents are cooled to −90° C. and the flask is rinsed out with liquid butanes which have also been cooled to −90° C., and the resulting product is added to a solution consisting of one volume isobutene, one volume butanes and one volume ethane, the temperature being −90° C. Polymerization proceeds rapidly but not voilently to form a solid colorless resin which is obtained on evaporating the diluents. The weight of chloral used in this preparation was about 2% of that of the isobutene being polymerized. Roughly, in this example, the polymerization rate is about half as great as observed in Example 1.

Example 3

A flask is filled with phosphine vapors at a pressure of about 100 mm. The flask and contens are cooled to about −100° C. and an excess of boron fluoride added. After reaction is complete (5–10 minutes) excess halide is pumped off and the flask is rinsed out with liquid butanes at −90° C. The resulting material is added to a mixture of one volume isobutene, one volume butanes and one volume of ethane cooled to −90° C. A rapid but not overly vigorous polymerization occurs with the formation of a solid resin which is obtained on evaporating the diluents. About 0.5% phosphine by weight based on the isobutene is employed in making the boron fluoride complex.

Example 4

A satured solution of succinic anhydride in liquid butanes is gradually cooled with stirring to −50° C. For each gram of anhydride taken, 0.6 g. boron fluoride is added and the resulting product is added to a solution containing, per gram of succinic anhydride, 60 g. isobutene, 60 g. butanes and 60 g. propane, reaction temperature being −50° C. A very thick colorless resin is obtained on evaporating the diluents.

Example 5

One gram of acetyl chloride is added to 80 g. of pure butanes and the mixture is cooled to −90° C. and 0.8 g. boron fluoride is added thereto. After thorough mixing the resulting material is added to 80 g. isobutene in 80 g. butanes and 80 g. ethane, also at a temperature of −90° C. A rapid but not violent reaction ensues and after vaporization of excess solvent a clear, rubber like solid is obtained.

It is to be understood that other boron fluoride complexes may be employed in place of or in addition to those described in the examples. Satisfactory complexes can also be made from acetyl bromide and acetyl iodide or other acid halides may be employed. Boron fluoride complexes that are useful in accomplishing the objects of this invention may also be made from acetic anhydride and other acid anhydrides. In general, it has been found that satisfactory results are obtained when using as catalysts boron holide complexes exhibiting equilibrium dissociation pressures in the neighborhood of 5 mm. or more at −70° C. Of the complexes described in the above examples, boron fluoride-acetyl chloride exhibits an equilibrium dissociation pressure of about 40 mm. at −70° C.; boron fluoride-chloral about 15 mm.; boron fluoride-phosphine about 50 mm. and boron fluoride-succinic anhydride about 5 mm. Also, although boron fluoride is by far the most active of the boron halides, it is to be understood that this invention is not to be considered as limited to complexes of this halide of boron alone.

The polymers prepared in accordance with this invention have many uses in the arts and industries. The highly viscous resins made at moderately low temperatures may, for example, be employed as plasticizers in carbon paper coating formulae. By employing these materials for the purpose many advantages follow. The resulting pigment carrying coating on the finished carbon paper is elastic, resilient and waterproof and exhibits good penetration into the paper and good fiber binding qualities. Because the coating is highly waterproof, varying conditions of humidity have less tendency to cause curling, wrinkling and crinkling of the finished paper than with papers of the prior art, this being especially true with extremely thin papers. Because of the elasticity and resiliency of the coating as well as the good penetration obtained, the coating does not crack or break off when sharply bent, for example, under the impact of type or otherwise.

Also, the viscous resins made at moderately low temperatures are useful as binders or as components of binders employed in the manufacture of foundry sand cores. For such purposes, the resin may be used alone, either dissolved in a solvent, naphtha for example, or emulsified in water. The sand is coated with either the solution or emulsion of the resin and is then made into cores as usual. The resulting cores have a high green bond strength and after baking may be safely handled. The resulting core is permeable, does not evolve obnoxious gases when in contact with the molten metal, does not burn into the casting and is easily removed therefrom. Preferably however, I employ the viscous resinous products of the instant invention as but one component of core binders of more or less orthodox nature otherwise. For example, resin in water emulsions may be used in conjunction with the various so called dry binders such as dextrine, dried milk products, clays and the like. Such mixtures give much higher green bond strengths than are observed in the absence of the resin and somewhat higher strengths after baking. Also, the resins of the instant invention, while incompatible with oil binders such as linseed, soya and cotton seed oils, may be incorporated therewith by forming emulsions with or without water.

The resulting materials also are excellent binders and exhibit many advantages over straight oil binders.

Additionally, the viscous resins prepared in conformity with the instant invention or otherwise, may be employed to advantage in insect traps of various kinds. For example, by impregnating stainless steel wool, mineral rock wool, cotton, burlap or similar supports with the viscous resins, for example, by soaking the support in a concentrated naphtha solution of the resin and then allowing the solvent to evaporate, products are formed which may be applied by known means as a band about the trunks of trees to prevent the migration of insects from the ground to the upper portion of the tree. The resin being extremely sticky, waterproof and resistant to oxidation forms an excellent barrier that retains its desirable properties for considerable periods of time regardless of the action of air, rain and other influences. If desired, a relatively thick coating of the viscous resinous polymer may be placed on paper or other suitable surface for use as insect traps in houses, et cetera.

While the instant invention has been largely described with respect to isobutene polymerization, it is not limited thereto. Other unsaturated hydrocarbons may be employed as charge. Among these may be mentioned 3-methyl butene-1, diolefines such as butadiene-1,3 and cyclopentadiene. Especially valuable products are obtained by polymerizing olefine-diolefine mixtures with the catalysts of this invention, such as propylene-butadiene and butenes-butadiene mixtures. Also, valuable resins are obtained by polymerizing highly unsaturated liquid hydrocarbon mixtures, for example, cracked wax distillate, by the use of catalysts of this invention.

Unsaturated compounds other than hydrocarbons may be polymerized with the catalysts hereinbefore described. Among these may be mentioned vinyl alkyl ethers such as vinyl isobutyl ether, the various alkyl methacrylates, vinyl acetate and the like.

It is obvious that the catalysts of the instant invention are particularly useful in the polymerization of unsaturated organic compounds at low temperatures, for example, room temperature or below, particularly 0° C. or below and even more particularly, −40° C. and below.

While my invention has been described by means of certain preferred embodiments and certain specific examples thereof it is to be understood that it is not intended to limit the scope thereby or thereto but only insofar as is consistent with the appended claims broadly interpreted.

I claim:
1. In the catalytic polymerization of isobutene, the step including contacting said isobutene at a temperature below 0° C. with a catalyst comprising a boron halide complex exhibiting an equilibrium dissociation pressure of at least 5 mm. at −70° C.

2. In the catalytic polymerization of isobutene, the step including contacting said isobutene at a temperature below 0° C. with a catalyst comprising a boron fluoride complex exhibiting an equilibrium dissociation pressure of at least 5 mm. at −70° C.

3. In the catalytic polymerization of isobutene, the step including contacting said isobutene at a temperature below 0° C. with a catalyst comprising a boron fluoride-acetyl chloride complex.

4. In the catalytic polymerization of isobutene, the step including contacting said isobutene at a temperature below 0° C. with a catalyst comprising a boron fluoride-chloral complex.

5. In the catalytic polymerization of isobutene, the step including contacting said isobutene at a temperature below 0° C. with a catalyst comprising a boron fluoride-succinic anhydride complex.

6. In the catalytic polymerization of isobutene in admixture with butadiene 1, 3, the step including contacting said mixture at a temperature below 0° C. with a catalyst comprising a boron fluoride-chloral complex.

7. In the catalytic polymerization of unsaturated hydrocarbons selected from the group consisting of isobutene, butadiene 1, 3 and mixtures thereof, the step including contacting said unsaturated hydrocarbons at a temperature below 0° C. with a catalyst comprising a boron halide complex exhibiting an equilibrium dissociation pressure of at least 5 mm. at −70° C.

8. In the catalytic polymerization of unsaturated hydrocarbons selected from the group consisting of isobutene, butadiene 1, 3 and mixtures thereof, the step including contacting said unsaturated hydrocarbons at a temperature below 0° C. with a catalyst comprising a boron fluoride complex exhibiting an equilibrium dissociation pressure of at least 5 mm. at −70° C.

9. In the catalytic polymerization of isobutene in admixture with butadiene 1, 3, the steps including contacting said mixture at a temperature below 0° C. with a catalyst comprising a boron fluoride-acetyl chloride complex.

10. In the catalytic polymerization of isobutene in admixture with butadiene 1, 3, the steps including contacting said mixture at a temperature below 0° C. with a catalyst comprising a boron fluoride-succinic anhydride complex.

ROBERT F. RUTHRUFF.